United States Patent

Sandusky et al.

Patent Number: 5,575,375
Date of Patent: Nov. 19, 1996

[54] MULTIPLE TRAY CARRIERS FOR EARLY BAG STORAGE SYSTEM

[75] Inventors: Donald Sandusky, Farmington Hills, Mich.; Ronald K. Taylor, Milton Keynes, England; Donald L. Anderson, Farmington Hills, Mich.

[73] Assignee: Jervis B. Webb Company, Farmington Hills, Mich.

[21] Appl. No.: 437,879

[22] Filed: May 9, 1995

Related U.S. Application Data

[63] Continuation-in-part of Ser. No. 135,464, Oct. 13, 1993, Pat. No. 5,413,205.

[51] Int. Cl.$^6$ .................................................. B65G 43/08
[52] U.S. Cl. ................ 198/358; 198/370.04; 198/683
[58] Field of Search ..................... 198/348, 349, 198/347.1, 358, 349.5, 370.02, 370.04, 370.07, 678.1, 680, 683, 685

[56] References Cited

U.S. PATENT DOCUMENTS

| | | | |
|---|---|---|---|
| 3,260,349 | 7/1966 | Vander Meer | 198/38 |
| 3,528,539 | 9/1970 | Speaker et al. | 198/370.04 |
| 3,610,159 | 10/1971 | Fickenscher | 198/349 X |
| 3,776,395 | 12/1973 | Lingg et al. | 214/6 BA |
| 4,392,767 | 7/1983 | Ischebeck | 198/349.7 X |
| 5,056,647 | 10/1991 | Rosenbaum | 198/460 |
| 5,072,822 | 12/1991 | Smith | 198/358 X |
| 5,307,921 | 5/1994 | Richardson | 198/370.04 |
| 5,413,205 | 5/1995 | Taylor et al. | 198/358 |

FOREIGN PATENT DOCUMENTS

| | | | |
|---|---|---|---|
| 2454985 | 11/1980 | France | 198/683 |
| 1247961 | 8/1967 | Germany | 198/683 |
| 3935598 | 5/1990 | Germany | 198/358 |
| 0275914 | 11/1987 | Japan | 198/358 |
| 0363646 | 12/1972 | U.S.S.R. | 198/349.6 |
| 1384593 | 2/1975 | United Kingdom | 198/346.6 |
| 1454859 | 11/1976 | United Kingdom | 198/358 |

*Primary Examiner*—James R. Bidwell
*Attorney, Agent, or Firm*—Dickinson, Wright, Moon, Van Dusen & Freeman

[57] ABSTRACT

A system for the storage of early baggage includes a storage conveyor with multiple tray carriers for receiving early bags from the baggage handling system, for example, of an airport and for discharging early bags onto the baggage handling system. The storage conveyor is arranged in a serpentine fashion for efficient use of horizontal space and includes evenly spaced entry and discharge stations. The system can deliver bags to the baggage handling system in a selected period of time to account for changes in flight departure times or changes in a passenger's travel plans.

21 Claims, 5 Drawing Sheets

MULTIPLE TRAY CARRIERS FOR EARLY BAG STORAGE SYSTEM

This application is a continuation-in-part of Ser. No. 08/135,464, Oct. 13, 1993, U.S. Pat. No. 5,413,205, granted on May 9, 1995.

TECHNICAL FIELD

This invention relates generally to the art of baggage storage and retrieval systems, and in particular to a system for the storage and retrieval of "early" bags. As used herein, the term "early bag" means a baggage item that enters the baggage handling system of an airport prior to the time it can be received at the make-up area of its departing flight.

BACKGROUND

It is often necessary for airline travellers to change airplanes at an intermediate airport. At the airport, a baggage handling group unloads the baggage from the incoming flight and transfers it to one or more departing flights so that each piece of luggage will arrive at the same destination as its owner. This operation is frequently complicated by the fact that there may be several flights with different departure times that connect with a particular incoming flight. In situations where the connecting flights are already being "made up" when the incoming flight arrives, the bags can usually be transferred directly to the connecting flights. However, when a connecting flight is not yet being made up, the bags designated for that flight must be stored until the make-up of the flight is "opened." Such bags are called "early bags".

Typically, the make-up for a flight is opened about two hours prior to the scheduled departure time of the flight. Thus, a bag arriving at the airport more than two hours prior to the scheduled departure time of its designated connecting flight is an early bag. Larger airports may require storage of up to 4000 early bags. Such bags can be from one-half hour to 24 hours early.

Presently, one preferred method for storing early bags is to load the bags onto carts. The carts are then placed in a storage area until a make-up is opened. After the make-up is opened, the bags are removed from the carts and placed on the airport's baggage conveyor system. However, systems of this type are very labor-intensive and inefficient.

Another known method is to provide the conveyor system with storage lanes for early bags. In this type of system, early bags for flights having make-up times within a certain time period can be loaded into the storage lanes. The bags are then discharged into the conveyor system when it is time for their respective flights to be made-up. However, systems of this type suffer from the disadvantage that the opening times of flights frequently change. When changes occur, all of the bags originally arranged to be discharged into the conveyor system at a particular time must be physically retrieved and reordered. In addition, a passenger may change his travel plans and request that his bag be provided to him. This requires a worker to physically search the storage lane for the bag and retrieve it for the passenger.

SUMMARY OF THE INVENTION

In accordance with the invention, an early bag storage system is provided which comprises one or more endless storage conveyors that communicate with, but are essentially separate from, a main conveyor system. Each storage conveyor is provided with a number of baggage carriers that are arranged in an end-to-end, endless fashion. Each baggage carrier is equipped with a plurality of vertically spaced trays for supporting baggage.

A computer records the destination of each bag on the main conveyor system and the opening time of the make-up area for the that destination. If the scheduled opening of the make-up area is more than two hours after arrival of the bag, the bag will automatically be sent to the early bag storage system.

Each storage conveyor in the storage system has at least one entry station where early bags are diverted from the main conveyor and loaded onto the trays of the baggage carriers. The storage system also has at least one discharge station for discharging bags from each storage conveyor back onto the main conveyor.

In the preferred embodiment, each storage conveyor has a plurality of discharge stations that are evenly spaced along the length of the conveyor. The spacing of the discharge stations is determined by the maximum time delay to be allowed for discharge of a bag. If only one discharge station is used, a bag will pass that station each time it makes a complete circuit. If the length of the circuit is small or the velocity of the storage conveyor high, the amount of time required for a bag to pass the discharge station may be short enough to meet the needs of the airport. For example, it may be determined that the delay in discharging a bag should be no more than fifteen minutes, and that such can be obtained for a single discharge station only for rather short storage conveyors.

In the usual situation, however, the number of bags to be stored is large. This requires a longer storage conveyor. If the conveyor moves at a preferred rate of about sixty feet per minute (60 FPM), the discharge stations may be as far apart as 900 feet and still provide the capability of discharging a bag within fifteen minutes of receipt of an instruction to do so. If the discharge stations are evenly separated by 900 feet, any bag on the storage system can be discharged within fifteen minutes without concern for the overall length of the storage conveyor. Insertion conveyors are also preferably spaced around the storage conveyor to allow a bag to be placed on an empty tray with a maximum delay of fifteen minutes.

It is also often desirable to use more than one storage conveyor. Thus, several storage conveyors may be arranged to receive incoming bags under the control of a computer that keeps track of the number of bags on each storage conveyor and directs incoming bags by a system of gates to the storage conveyor having excess capacity. The computer also controls the discharge of bags from the storage conveyors for delivery to their respective make-up areas. The various discharge stations are in communication with the main conveyor system of the airport. This arrangement provides a certain redundancy so that a breakdown of one of the conveyors does not disable the entire system.

Each storage conveyor preferably uses a plurality of carriers, each of which is equipped with a plurality of vertically spaced trays. Each tray on each carrier receives a single bag. The length of a bag is preferably measured by photoelectric elements as the bag is conveyed onto the insertion conveyor to allow the bag to be placed in the center of a tray, e.g., by using a shaft encoder to correlate the movement of the insertion conveyor to the position of the bag as determined by the photoelectric elements. In some embodiments, two trays may be used to accommodate large bags, in which case the center of the bag may be placed at the center of the two trays.

The trays and/or carriers may be coded for identification and automatic reading by a scanner, or the like. A supervisory computer maintains the correlation between a particular bag and a particular tray or carrier. The identification of a particular bag may be accomplished, for example, by laser scanning of pre-printed baggage tags having IATA ten digit bar codes, as is known in the art, or may be manually entered by an operator. Identification of the trays or carriers may be accomplished by similar means.

The conveyor is preferably an inverted or overhead powered conveyor which utilizes a continuously moving chain. This type of conveyor is inexpensive and responsive and provides high density storage, especially when used in conjunction with the multi-tray carriers of the present invention.

BRIEF DESCRIPTION OF THE DRAWINGS

FIG. 2b is a transverse elevation view of the system of FIG. 2a;

DETAILED DESCRIPTION OF THE INVENTION

Figure 1:
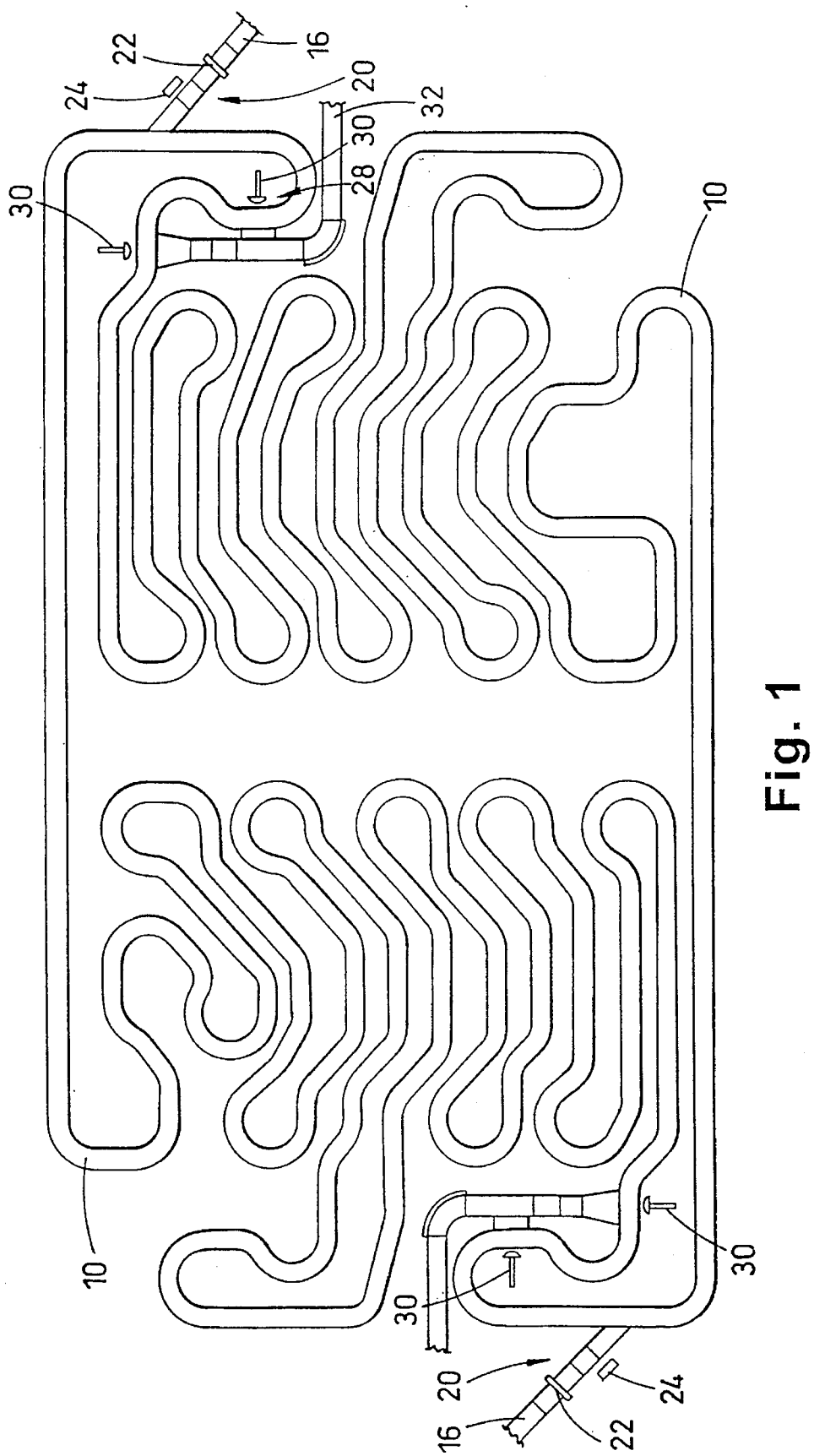
FIG. 1 is a schematic plan view of one loop of an early baggage storage conveyor system in accordance with the invention.
Figure 2A:
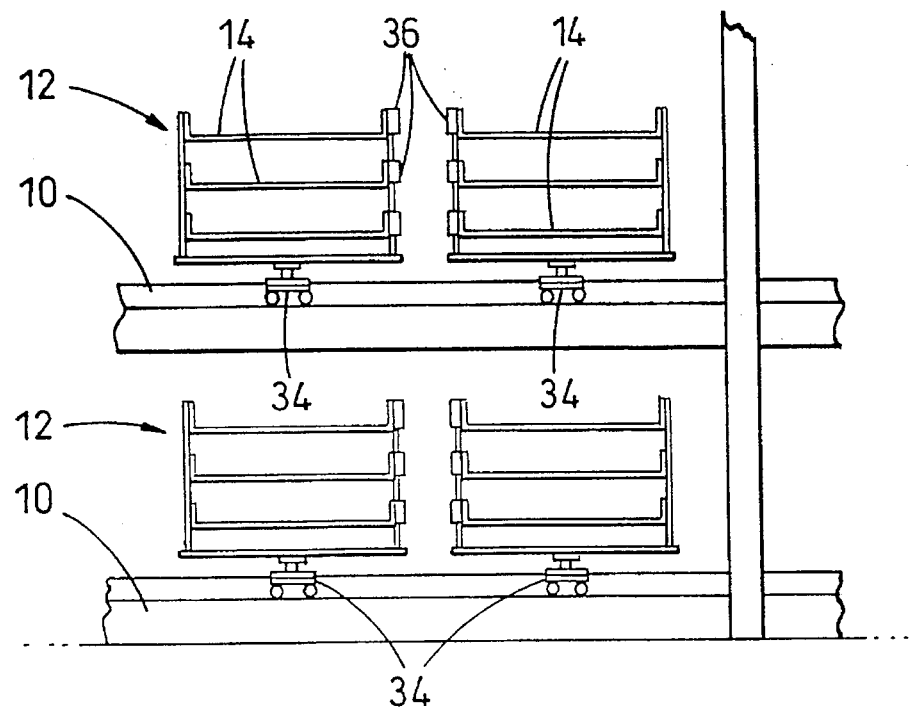
FIG. 2a is a side elevation view of a portion of a two-level early baggage storage conveyor system in accordance with the invention.
Figure 2B:
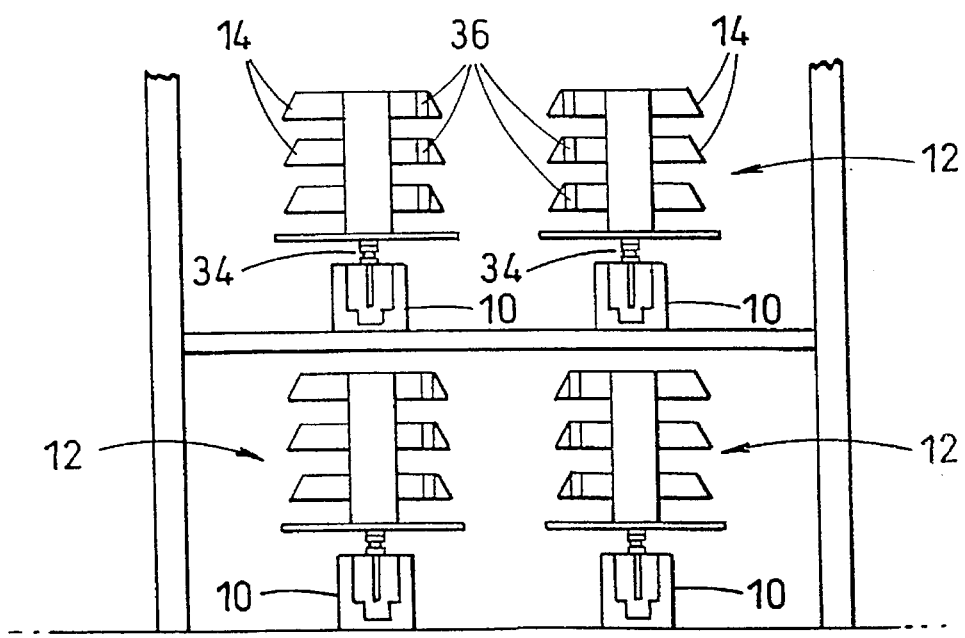

With reference to FIG. 1, the early baggage storage system of the present invention comprises at least one storage conveyor 10 provided with a plurality of carriers 12 (see FIGS. 2a and 2b). While various types of conveyors may be used in the present invention, including overhead power and free conveyors, the conveyor is preferably an inverted conveyor, and more preferably an inverted power only conveyor of known construction. The conveyor is arranged in a serpentine fashion to maximize the length of the conveyor with respect to the floor area it covers. The conveyor preferably moves the carriers at a rate of about sixty feet per minute.

The baggage handling system at an airport receives bags from ticket counters or from transfer baggage subsystems, where each bag is identified by a scanner or by manual entry. After they are identified, the early bags are supplied to the storage conveyor by an induction conveyor 16 that communicates with the rest of the baggage handling system.

The induction conveyors are equipped with scanner stations 21, each of which is provided with a scanner 22 for identifying a particular bag and photoelectric elements 23 (see FIG. 3) for measuring the length of the bag. A manual entry keyboard 24 is provided adjacent each of the induction conveyors to permit manual entry of this data if automatic scanning is not possible for a particular bag. The length and identification of the bag is supplied to an early baggage conveyor controller 26 (see FIG. 3) that operates the induction device to load each bag onto a carrier.

FIGS. 4a–5b illustrate the carriers used in the storage conveyors of the present invention. The carriers are equipped with a plurality of vertically spaced trays 14, each of which can accept a single bag. Preferably, the bags are loaded onto the centers of the trays. This is accomplished by using the length of the bag, as determined by the photoelectric elements at the scanning station, to control the movement of the induction conveyor with respect to the movement of the early baggage conveyor. In some embodiments, if the bag is too large for a single tray, it is loaded onto two trays.

Various means may be used in conjunction with the induction device to load bags onto the individual trays. For example, the induction device may be provided with separate ramps that load bags onto all trays at a certain height. Access to the ramps may be controlled by a series of gates under the control of the early baggage conveyor controller, thus allowing a particular bag to be stored on a particular tray. Alternatively, the induction device itself may be constructed so that it can be raised or lowered, by pneumatic means or otherwise, as necessary to place baggage onto a particular tray. The induction device may be equipped with pushers that operate alone or in conjunction with the gates, ramps, or pneumatic means to place a bag onto a particular tray.

Referring again to FIG. 1, the early baggage storage system is further provided with discharge stations 28 that are equipped with discharge pushers 30. The pushers unload early bags onto a return conveyor 32 for return to the airport's baggage handling system. The discharge pushers for each discharge station are illustrated in FIG. 1 in alternative positions. In actual practice, however, it is usually sufficient to have a single discharge pusher at each discharge station. As with the induction conveyors, the return conveyors may be provided with ramps or pneumatic pumps to allow bags from trays of a particular height to be removed from the carriers.

The dimensions of the early baggage conveyor and the capacities of the induction and return conveyors are normally unique to each installation. In a preferred embodiment, however, the induction and return conveyors are designed to carry about seventeen bags per minute, with a particular carrier in a position to discharge (or receive, if empty) bags about every fifteen minutes.

As shown in FIGS. 2a and 2b, the early baggage storage system of the present invention may also comprise a plurality of the systems illustrated in FIG. 1. Thus, the storage conveyors may be stacked vertically, arranged side-by-side horizontally, or both, to maximize the storage capability for any given area available in the airport. The two conveyors may also be arranged on each of a plurality of vertically spaced levels to provide increased baggage storage capacity for a given horizontal area of airport space.

As shown in FIGS. 2a–2b, the conveyors are preferably power only inverted conveyors, although overhead conveyors may also be used (see FIGS. 4a–5b). Each of the conveyors may include a plurality of trolleys 34 as is known to the art, and each of the trolleys in turn may support a carrier equipped with multiple trays for supporting pieces of baggage.

An identification plate 36 is affixed to each of the trays on the carriers. The identification plates are oriented so that a scanner can detect an identification symbol on the tray for ascertaining the identity of that particular tray. Separate identification plates may also be mounted on the carriers to allow the scanners to ascertain their identity.

The scanner may be of several known types, including optical, microwave, electronic, or the like. The identification plates, which are chosen to be compatible with the scanner, may also be of several different types, and may include alphanumeric sequences or bar codes. Other identification systems as are known to the art may also be suitable.

In the system illustrated in FIGS. 2a and 2b, the overall baggage handling system of the airport is designed to supply early bags to any of the induction conveyors, and to receive bags from return conveyors associated with each of the storage conveyors. The induction conveyors may be attached at any level to the baggage handling system.

Figure 3:
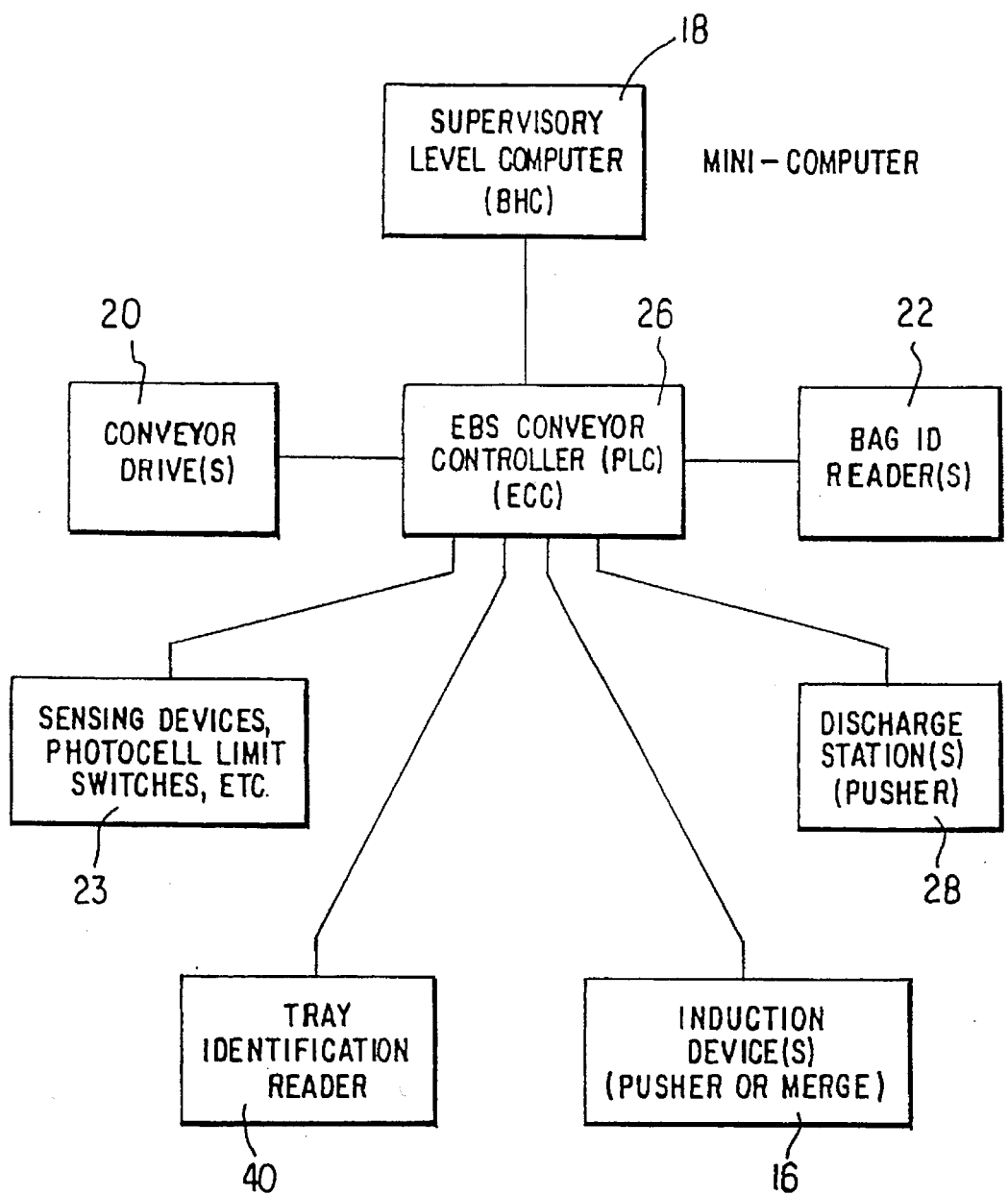
FIG. 3 is a block diagram showing a preferred control system for an early baggage storage system in accordance with the invention.

FIG. 3 illustrates a control system for a baggage handling system in accordance with the invention. The control system includes a supervisory computer 18 which stores the identity of each bag in the system, determines the opening time of the make-up for the flight on which the bag is to be carried, and determines from the arrival time and the opening time whether the bag is an early bag. Baggage entering the system is identified, for example, by scanning the baggage tags, and the flight information for that bag can be ascertained from the flight information display system (F.I.D.), which is interfaced with the supervisory computer. The supervisory computer determines which of the bags in the baggage handling system is an early bag, e.g., by comparison of the time of arrival of the bag with the expected departure time of the flight on which the bag will be loaded.

An early baggage system conveyor controller 26 controls each conveyor in the early baggage system. This controller receives information about the bags to be loaded onto the early baggage storage conveyor from the supervisory computer and confirms the identity of each bag actually entering the early baggage storage system by data received from the scanning station. The conveyor controller controls the induction conveyor to load a particular bag onto a particular tray in the desired configuration, and records the identity of the tray on which the particular bag is loaded as determined by a tray identification reader 40. In some embodiments, the identity of the carrier may also be recorded. The conveyor controller correlates each particular bag with the particular tray carrying it as long as that bag is on the early baggage storage conveyor.

When the supervisory computer determines that a bag is to be retrieved from the early baggage storage conveyor, as when the make-up area for the bag's departing flight has opened or a customer has called for his bag, the computer instructs the controller to discharge that bag. The controller then controls the discharge pushers to discharge the bag from the early baggage storage conveyor to a return conveyor, which carries it to the overall baggage handling system of the airport.

Referring again to FIGS. 4a–4c and 5a, as previously noted, the carriers of the present invention are equipped with a plurality of vertically spaced trays. This has the advantage of providing a greater baggage storage density per unit of surface storage area. In the preferred embodiment, these trays are supported on a rectangular frame 41 having first and second horizontal support members 42, 42' and first and second vertical support members 44, 44'. The first horizontal support member is attached to one or more trolleys in the overhead conveyor by means of support flanges 46.

In some embodiments, the trays are rotatably mounted on the rectangular frame so that they will tilt within a limited range in a given direction, thereby facilitating loading or unloading operations. This may be accomplished, for example, by attaching the trays to the frame by an axle fitted with bearings, and by providing the axle or trays with stop plates that will arrest the motion of the trays after they have rotated around the axle a predetermined distance in a given direction.

The trays may also be fitted with a locking mechanism that locks the trays in a given orientation until the lock has been deactivated. The locking mechanism may serve to lock the trays in an upright position or other predetermined orientation, or to lock them in a tilted position to facilitate loading or unloading operations.

In some embodiments, the locking mechanism 56 is controlled so that it is activated or deactivated depending on the position of the carrier on the storage conveyor. Thus, in one embodiment, the trays are locked in an upright position until the carrier has entered a loading or unloading zone, at which time the locking mechanism is deactivated to facilitate loading or unloading operations. In another embodiment, the trays are locked in a first position 58 while the carrier is in a loading or unloading zone, and are locked in a second position 58' otherwise.

While various locking devices may be suitable for use in the present invention, the preferred device is a series of extendable tabs located along the support members of the carrier frame which releasably engage apertures in the trays, thereby locking the trays in a predetermined orientation. The locking device may be controlled by electronic or pneumatic motors that move the tabs between locked or unlocked positions. The motors may be equipped with switches that activate the motors at appropriate times, as when a carrier is approaching a loading zone and the trays of the carrier need to be unlocked. The switches may be controlled by sensors located along the conveyor at strategic points, such as at the periphery of a loading or unloading zone. In some embodiments, the switches are controlled by a central computer.

Figure 4A:
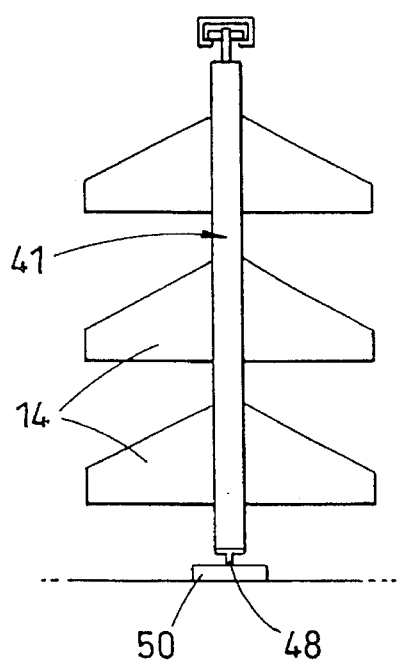
FIG. 4a is a transverse elevation view of a baggage carrier for an early baggage conveyor system in accordance with the invention.
Figure 4B:
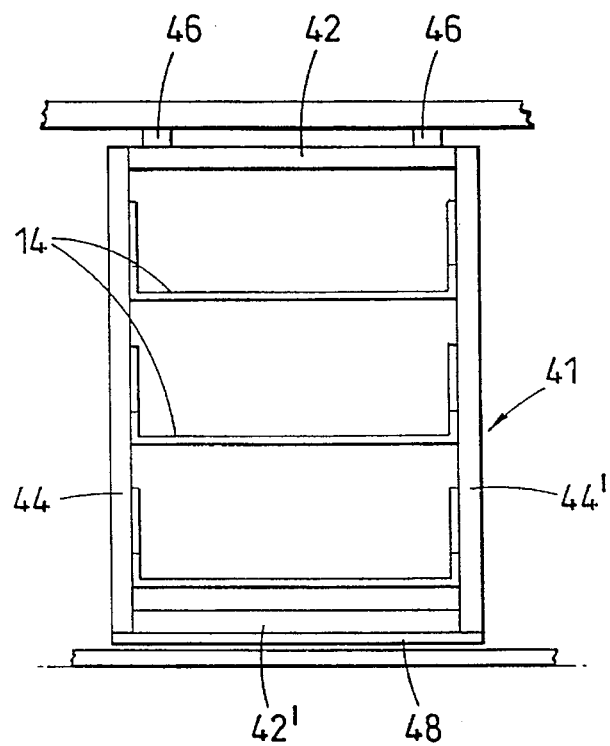
FIG. 4b is a side elevation view of a baggage carrier for an early baggage conveyor system in accordance with the invention.
Figure 4C:
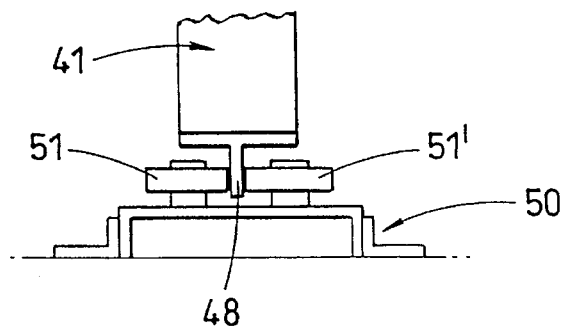
FIG. 4c is a transverse elevation view of a lower conveyor track of the type used in loading areas in the early baggage conveyor system in accordance with the invention.

The second horizontal support member is provided with a vertically protruding guide plate 48. As shown in FIG. 4c, the storage conveyor may be provided in loading and unloading areas with one or more guide rails 50 that engage the guide plate and prevent the carriers from moving laterally as bags are loaded or unloaded from the trays of the carriers. The guide rails are provided with opposing guide wheels 51, 51' that are spaced apart sufficiently to accommodate the guide plate on the carrier, but that are sufficiently close together to check the lateral movement of the carrier.

Figure 5A:
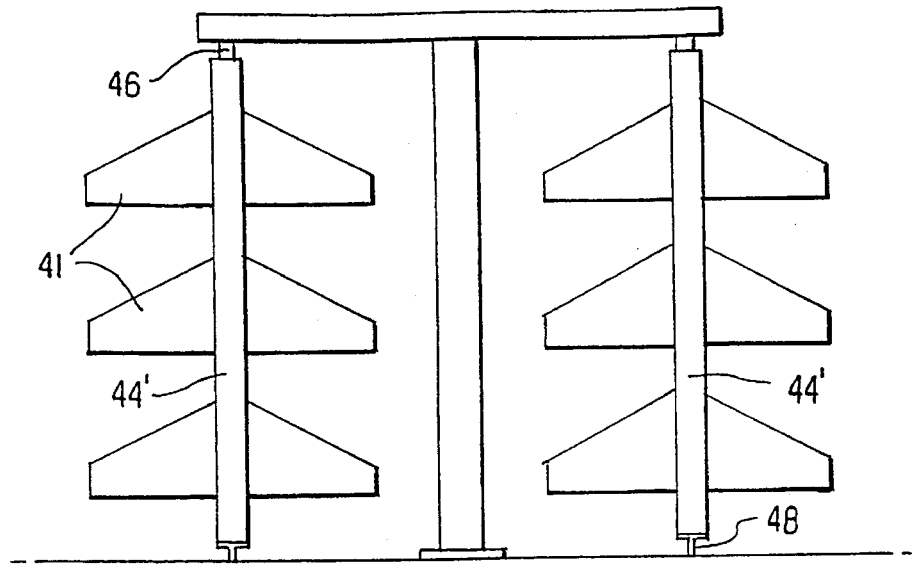
FIG. 5a is a transverse elevation view showing the disposition of baggage carriers in an early baggage conveyor system in accordance with the invention.
Figure 5B:
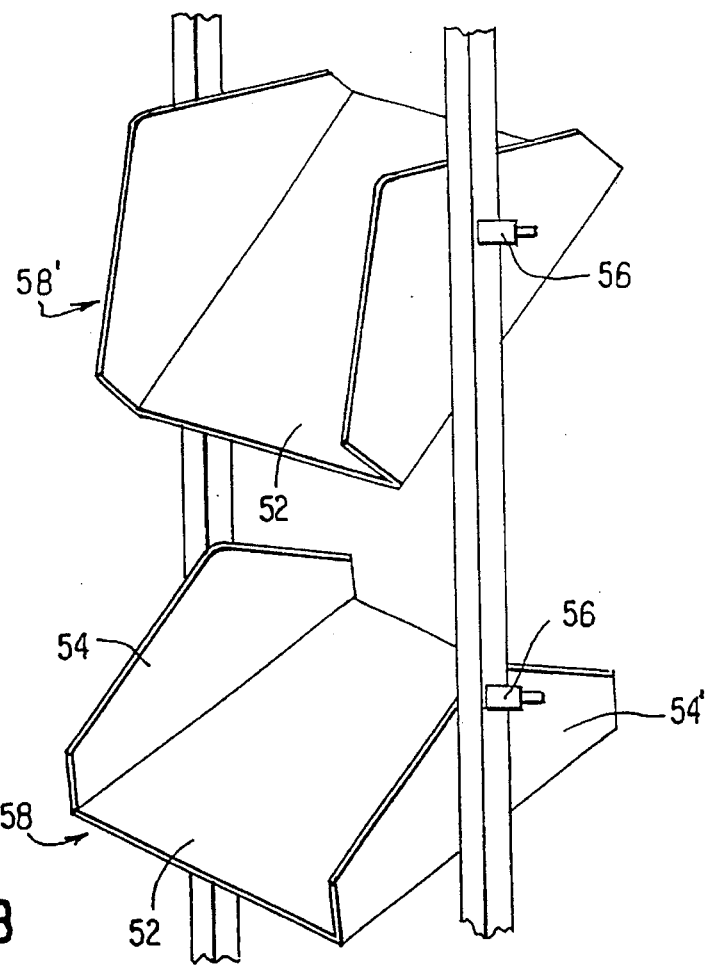
FIG. 5b is an isometric view of a tray used in the baggage carriers of an early baggage conveyor system in accordance with the invention.

FIG. 5b shows the trays used with the storage conveyors of the present invention. The trays preferably have a flat, level bottom 52 and opposing sides 54, 54'. The trays may be affixed to the vertical support members by any of the suitable means known to the art, as by welding or riveting. However, it is preferred that the trays are bolted into place to facilitate their replacement or removal as the system is modified or upgraded. In some embodiments, the vertical support members may be provided with a plurality of holes into which the bolts can be set, thereby allowing the distance between the trays, and the number of trays incorporated into a carrier, to be changed in accordance with system demands.

It will be appreciated that a unique system for the storage of early baggage has been disclosed. Modifications within the scope of the appended claims will be apparent to those of skill in the art.

What is claimed is:

1. An apparatus for storing early bags arriving at an airport and for discharging such stored early bags to a make-up operation for a desired departure flight, comprising:

an endless storage conveyor having a plurality of baggage carriers, each of said baggage carriers being equipped with a plurality of trays, each said tray being adapted to receive one of said early bags, said trays being arranged in end-to-end endless fashion and supported for continuous recirculating movement on a path of travel defined by a conveyor track;

induction conveyor means for loading each of said early bags onto a separate one of said baggage carriers;

identification means for identifying each of said early bags and the said baggage carrier onto which it is loaded; and discharge means adjacent to a portion of said conveyor track for selectively removing early bags from baggage carriers passing said discharge means.

2. The apparatus of claim 1, wherein said conveyor track is serpentine.

3. The apparatus of claim 1, wherein said conveyor track comprises a plurality of vertically spaced tracks.

4. The apparatus of claim 1, wherein said conveyor track comprises a plurality of horizontally arranged tracks.

5. The apparatus of claim 1, further comprising a plurality of discharge stations evenly spaced along said conveyor track.

6. The apparatus of claim 1, wherein said induction means receives said early bags from a baggage handling system, and said discharge means returns said bags to said baggage handling system.

7. A method for storing early bags arriving at an airport and discharging the stored early bags to a make-up operation for a desired departure flight, comprising the steps of:

providing a storage area for said early bags;

providing in the storage area a continuously driven conveyor equipped with a conveyor track;

providing the conveyor with a plurality of baggage carriers arranged in an end-to-end endless fashion, wherein each carrier is equipped with a plurality of trays, each tray being adapted to receive an early bag, and wherein each carrier is supported for recirculating movement on a path of travel defined by the conveyor track;

identifying and recording each early bag arriving at the airport and its departure flight;

loading each of the identified early bags onto a tray on a baggage carrier, and recording the identity of that tray;

providing discharge means, adjacent to a portion of the path of travel of said baggage carriers, for removing early bags from the carriers;

determining the opening time of the make-up operation for each departure flight; and selectively removing from the baggage carriers passing by the discharge means early bags for each departure flight, in response to the opening time of the make-up operation of the flight.

8. The method of claim 7, further comprising the step of:

providing an induction conveyor adjacent to at least one portion of the path of travel of the baggage carriers for loading the early bags onto the carriers.

9. A method for storing early bags arriving at an airport and discharging such stored early bags to a make-up operation for a desired departure flight, comprising the steps of:

providing a storage area for said early bags;

installing in said storage area a conveyor system having arranged thereon a plurality of baggage carriers, each carrier comprising a plurality of trays, each of said trays being adapted to receive an early bag, and each carrier supported for recirculating movement on a path of travel defined by a conveyor track;

identifying each early bag and its departure flight, and recording this information;

providing identifying means for identifying each of said baggage carriers;

providing induction conveyor means adjacent to at least one portion of said path of travel of said baggage carriers for loading each of said identified early bags onto one of said baggage carriers;

recording the identity of the carrier onto which each bag is placed;

providing discharge station means adjacent to another portion of said path of travel of said baggage carriers for removing early bags from the baggage carriers;

determining the opening time of said make-up operation for each departure flight; and selectively removing from said baggage carriers passing by said discharge station means early bags for each departure flight in response to the opening of the make-up operation thereof.

10. The method of claim 9, wherein the identifying means also identifies the tray on which a bag is placed.

11. A method according to claim 9 wherein said discharge station means comprises at least two discharge stations substantially equally spaced apart along said conveyor track.

12. A method according to claim 9 wherein said induction conveyor means comprises a plurality of said induction conveyor means spaced apart along said conveyor track.

13. An apparatus for storing early bags, comprising:

a conveyor track;

a plurality of baggage carriers supported from said conveyor track, each of said carriers having a plurality of trays adapted to receive one of said early bags, and each of said carriers equipped on the bottom with a vertically protruding guide plate; and at least one guide rail segment, substantially parallel to said conveyor track, adapted to receive said guide plate.

14. The apparatus of claim 13, further comprising:

an induction conveyor for loading each of said early bags onto a separate one of said baggage carriers.

15. The apparatus of claim 13, further comprising:

identifying means for identifying each of said early bags and the said baggage carrier onto which it is loaded.

16. The apparatus of claim 13, further comprising:

discharge means, adjacent to a portion of said conveyor track, for selectively discharging early bags from said baggage carriers as they pass said discharge means.

17. The apparatus of claim 13, wherein said conveyor track is an inverted conveyor.

18. The apparatus of claim 13, wherein said trays are mounted on said carriers in such a way that they will tilt within a limited range.

19. The apparatus of claim 18, further comprising locking means for locking said trays in a particular orientation.

20. The apparatus of claim 19, wherein said locking means unlocks said trays while said carriers are in a loading or unloading zone, and locks said trays in a predetermined orientation otherwise.

21. The apparatus of claim 19, wherein said locking means locks said trays in a first orientation while said carriers are in a loading or unloading zone, and locks said trays in a second orientation otherwise.

* * * * *